United States Patent
Tsai

(10) Patent No.: US 9,272,622 B2
(45) Date of Patent: Mar. 1, 2016

(54) MULTI-VIEW MOVABLE PROJECTION SYSTEM

(71) Applicant: Chih-Hsien Tsai, Hsinchu (TW)

(72) Inventor: Chih-Hsien Tsai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 533 days.

(21) Appl. No.: 13/658,782

(22) Filed: Oct. 23, 2012

(65) Prior Publication Data

US 2013/0293851 A1 Nov. 7, 2013

(30) Foreign Application Priority Data

May 4, 2012 (TW) ............................. 101115978 A

(51) Int. Cl.
*H04N 13/04* (2006.01)
*B60K 35/00* (2006.01)
*G03B 21/602* (2014.01)
(Continued)

(52) U.S. Cl.
CPC .............. *B60K 35/00* (2013.01); *G02B 27/126* (2013.01); *G03B 21/10* (2013.01); *G03B 21/14* (2013.01); *G03B 21/145* (2013.01); *G03B 21/602* (2013.01); *G03B 21/62* (2013.01); *H04N 13/045* (2013.01); *H04N 13/0445* (2013.01); *B60K 2350/206* (2013.01); *B60K 2350/2052* (2013.01); *B60K 2350/2086* (2013.01); *G02B 5/0231* (2013.01); *G02B 5/0242* (2013.01);
(Continued)

(58) Field of Classification Search
CPC .... G03B 21/602; G03B 21/60; G03B 21/145; H04N 13/045; H04N 13/0447; H04N 13/0445
USPC ........................................... 353/11, 12, 13, 14
See application file for complete search history.

(56) References Cited

U.S. PATENT DOCUMENTS 5,895,110 A * 4/1999 Okada et al. ..................... 353/31
6,310,726 B1 * 10/2001 Iizuka ........................... 359/618
(Continued)

FOREIGN PATENT DOCUMENTS

CN 1580935 2/2005
CN 101533207 9/2009
(Continued)

OTHER PUBLICATIONS

"Office Action of Japan Counterpart Application", issued on Apr. 30, 2014, p. 1-p. 4.
(Continued)

*Primary Examiner* — Bao-Luan Le
(74) *Attorney, Agent, or Firm* — Jianq Chyun IP Office

(57) ABSTRACT

A projection system including a projection screen and a projection apparatus is provided. The projection screen has a plurality of optical microstructures. The optical microstructures are arranged along a first direction. The projection apparatus is capable of moving relative to the projection screen along the first direction. The projection apparatus includes an illumination unit, a light valve, and a projection lens. The illumination unit is capable of providing an illuminating beam. The light valve is disposed on a transmission path of the illuminating beam. The light valve is capable of converting the illuminating beam to an image beam. The projection lens is disposed on a transmission path of the image beam. The projection lens is capable of moving relative to the light valve along a second direction and projecting the image beam on the projection screen. The first direction and the second direction are opposite directions.

12 Claims, 11 Drawing Sheets

(51) Int. Cl.
    *G03B 21/14*     (2006.01)
    *G03B 21/62*     (2014.01)
    *G02B 27/12*     (2006.01)
    *G03B 21/10*     (2006.01)
    *G03B 21/60*     (2014.01)
    *G02B 5/02*     (2006.01)
    *G02B 27/10*     (2006.01)

(52) U.S. Cl.
    CPC ............... *G02B27/108* (2013.01); *G03B 21/60* (2013.01); *H04N 13/0418* (2013.01); *H04N 13/0447* (2013.01)

(56) References Cited

U.S. PATENT DOCUMENTS

| | | | |
|---|---|---|---|
| 6,424,437 B1* | 7/2002 | Popovich | 359/15 |
| 7,207,680 B2* | 4/2007 | Yamasaki et al. | 353/101 |
| 7,443,582 B2 | 10/2008 | Yamauchi | |
| 7,494,229 B2* | 2/2009 | Miyasaka | 353/101 |
| 7,580,186 B2 | 8/2009 | Mather et al. | |
| 8,251,521 B2* | 8/2012 | Mizushima et al. | 353/98 |
| 8,363,325 B2* | 1/2013 | Kuhlman et al. | 359/639 |
| 2005/0057442 A1* | 3/2005 | Way | 345/9 |
| 2005/0122483 A1* | 6/2005 | Yamasaki et al. | 353/69 |
| 2005/0168698 A1* | 8/2005 | Nagayoshi | 353/30 |
| 2007/0177113 A1 | 8/2007 | Huibers | |
| 2011/0075108 A1* | 3/2011 | Kojima et al. | 353/38 |
| 2011/0216290 A1* | 9/2011 | Maruyama | 353/101 |
| 2012/0019781 A1* | 1/2012 | Kuhlman et al. | 353/13 |
| 2012/0062999 A1* | 3/2012 | Kuhlman et al. | 359/639 |
| 2012/0170108 A1* | 7/2012 | Kuhlman et al. | 359/298 |
| 2012/0229771 A1* | 9/2012 | Hashimoto et al. | 353/7 |

FOREIGN PATENT DOCUMENTS

| | | |
|---|---|---|
| CN | 101576680 | 11/2009 |
| JP | H07218893 | 8/1995 |
| JP | 2003337382 | 11/2003 |
| JP | 2006011237 | 1/2006 |
| JP | 2006159931 | 6/2006 |
| JP | 2007047366 | 2/2007 |
| JP | 2008089933 | 4/2008 |
| JP | 2008158173 | 7/2008 |
| JP | 2009258621 | 11/2009 |
| JP | 2010128252 | 6/2010 |
| JP | 2010-266482 | 11/2010 |
| TW | 200710433 | 3/2007 |
| TW | 200732824 | 9/2007 |

OTHER PUBLICATIONS

"Office Action of Taiwan Counterpart Application", issued on Jan. 8, 2014, p. 1-p. 3.

"Office Action of China Counterpart Application," issued on Nov. 27, 2014, p. 1-p. 6.

"Office Action of Japan Counterpart Application," issued on Dec. 9, 2014, p. 1-p. 3.

"Office Action of China Counterpart Application," issued on Jul. 28, 2015, p. 1-p. 6.

* cited by examiner

MULTI-VIEW MOVABLE PROJECTION SYSTEM

CROSS-REFERENCE TO RELATED APPLICATION

This application claims the priority benefit of Taiwan application serial no. 101115978, filed on May 4, 2012. The entirety of the above-mentioned patent application is hereby incorporated by reference herein and made a part of this specification.

BACKGROUND

1. Field of the Invention

The invention relates to a projection system, and more particularly, to a projection system including a movable projection apparatus used in vehicles.

2. Description of Related Art

Generally speaking, current display systems in vehicles allow drivers and passengers to watch at the same time. However, in recent years, authorities in the government have started to request drivers to watch vehicle information (such as a navigation image) only and forbid watching any entertainment images when the driver is driving the vehicle. Therefore, some manufacturers provide a set of on-board display system which provides two kinds of images at the same time; one image (such as a navigation image) is transmitted towards the drivers' direction, while the other image (such as an entertainment image) is transmitted towards the passengers' direction. In this way, the drivers and the passengers may watch the required images at the same time, and the drivers may not violate regulations of the government authorities. However, this set of on-board display system restricts what image the drivers watch and may not adjust itself according to the needs of the users correspondingly.

U.S. Pat. No. 7,580,186 discloses a multiple-view directional display for vehicles, the multiple-view directional display including a display, a lenticular screen, and a lens structure. US Patent Publication No. 20070177113 discloses a digital image projection system including a light source for providing illumination light, a reflective mirror, a condenser lens, a light valve, and a projection lens set. U.S. Pat. No. 7,443,582 discloses a screen and a projector, wherein a relative position of the screen and the projector may be adjusted.

SUMMARY OF THE INVENTION

The invention provides a projection system, and the projection system satisfies various needs of different viewers.

Other features and advantages of the invention can be further illustrated by the technical features disclosed in the invention.

In order to achieve one or a portion of or all of the features or other features, an embodiment of the invention provides a projection system including a projection screen and a projection apparatus. The projection screen has a plurality of optical microstructures. The optical microstructures are arranged along a first direction. The projection apparatus is capable of moving relative to the projection screen along the first direction. The projection apparatus includes an illumination unit for providing an illuminating beam, a light valve disposed on a transmission path of the illuminating beam, and a projection lens. The light valve is used for converting the illuminating beam into an image beam. The projection lens is disposed on the transmission path of the image beam. The image beam is transmitted to the projection screen through the projection lens. The projection lens is capable of moving relative to the light valve along a second direction. The first direction and the second direction are opposite directions.

In an embodiment of the invention, the projection screen has a first side and a second side opposite to each other. When the projection apparatus moves from a first position corresponding to the first side along the first direction to a second position corresponding to the second side, the image beam is transmitted to the projection screen and then deflects towards the first side of the projection screen by a guidance of the optical microstructures.

In an embodiment of the invention, the projection lens has an optical axis. The light valve has a central axis and an active surface towards the projection lens. The central axis passes through a center of the active surface and is perpendicular to the active surface. When the projection apparatus moves from the first position to the second position, a shortest distance between the optical axis and the first side is shorter than a shortest distance between the central axis and the first side.

In an embodiment of the invention, each of the optical microstructures has a first side surface, a second side surface, and a bottom surface connected to the first side surface and the second side surface. The first side surface faces the first side. The second side surface faces the second side. A normal vector of the bottom surface is substantially perpendicular to the first direction. The first side surface and the second side surface are oblique relative to the bottom surface. An oblique direction of the first side surface is opposite to an oblique direction of the second side surface.

In an embodiment of the invention, when the projection apparatus moves from the first position corresponding to the first side along the first direction to the second position corresponding to the second side, a portion of the image beam is totally reflected by the second side surface and deflects towards the first side of the projection screen, and another portion of the image beam is refracted by the first side surface and deflects towards the first side of the projection screen.

In an embodiment of the invention, when the projection apparatus moves from the second position corresponding to the second side along the first direction to the first position corresponding to the first side, a portion of the image beam is totally reflected by the first side surface and deflects towards the second side of the projection screen. Another portion of the image beam is refracted by the second side surface and deflects towards the second side of the projection screen.

In an embodiment of the invention, the optical microstructures are, for example, a plurality of prisms. An extension direction of each of the prisms is staggered vertically with the first direction and the second direction, respectively.

In an embodiment of the invention, the projection lens has an optical axis. The plurality of optical microstructures includes a plurality of first optical sub-microstructures located between the optical axis and the first side and a plurality of second optical sub-microstructures located between the optical axis and the second side. The active surface of the light valve towards the projection lens has a first image area and a second image area. A position of the first image area corresponds to the projection screen between the optical axis and the first side. A position of the second image area corresponds to the projection screen between the optical axis and the second side. A portion of the image beam passing through the first image area deflects towards the second side of the projection screen by a guidance of the second optical sub-microstructures. A portion of the image beam passing through the second image area deflects towards the first side of the projection screen by a guidance of the first optical sub-microstructures.

In an embodiment of the invention, the active surface of the light valve further has a compensation area. The compensation area is located between the first image area and the second image area, and the optical axis passes through the compensation area.

In an embodiment of the invention, the projection system further includes a drive unit. The drive unit is connected to the projection apparatus. The drive unit is used for making the projection apparatus move relative to the projection screen along the first direction and making the projection lens move relative to the light valve along the second direction.

Based on the above, the embodiments of the invention achieve at least one of the following advantages or effects. In embodiments of the invention, with a collocation of the optical microstructures of the projection screen and projection directions of the projection apparatus, the image beam emitted by the projection apparatus is transmitted to certain areas; therefore, a projection system of an embodiment of the invention satisfies various needs of the users.

To make the above features and advantages of the invention more comprehensible, embodiments accompanied with drawings are described in detail below.

DESCRIPTION OF EMBODIMENTS

Both the foregoing and other technical descriptions, features and advantages of the invention are intended to be described more comprehensively by providing an embodiment accompanied with drawings hereinafter. The language used to describe the directions such as up, down, left, right, front, back or the like in the reference drawings is regarded in an illustrative rather than in a restrictive sense. Thus, the language used to describe the directions is not intended to limit the scope of the invention.

Figure 1:
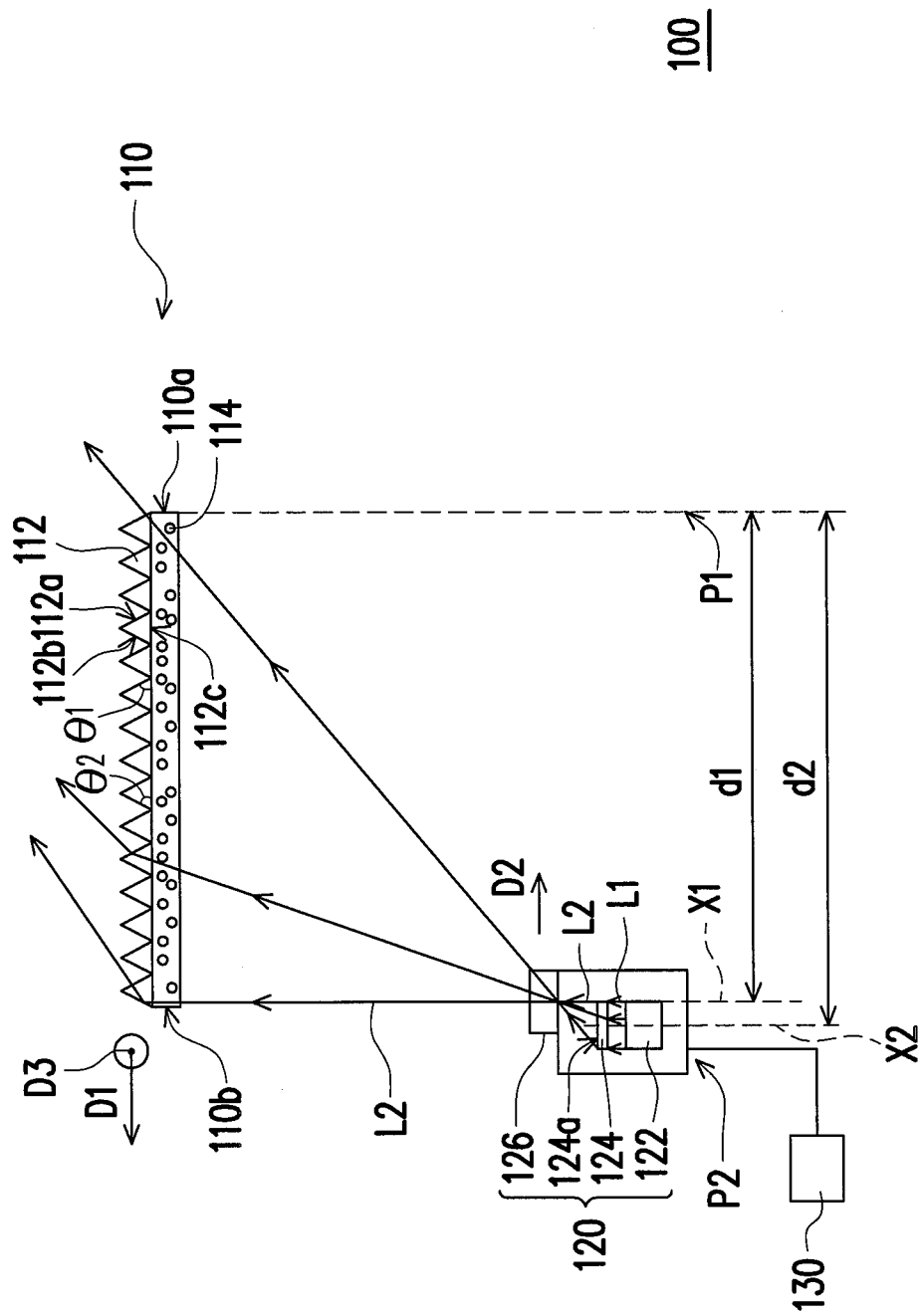
FIG. 1 is a schematic view of a projection system according to an embodiment of the invention.

Referring to FIG. 1, a projection system 100 of the embodiment includes a projection screen 110 and a projection apparatus 120. The projection screen 110 receives an image beam L2 from the projection apparatus 120. The projection screen 110 has a plurality of optical microstructures 112. The projection screen 110 may further have scattering particles 114. In the embodiment, the optical microstructures 112 collocate with a projection direction of the projection apparatus 120 (i.e. a transmission direction of the image beam L2 after the image beam L2 leaves the projection apparatus 120) and make the image beam L2 transmitted towards a certain direction. When the image beam L2 is transmitted to the projection screen 110, the scattering particles 114 improve uniformity of light emitted by the image beam L2.

The projection apparatus 120 of the embodiment includes an illumination unit 122, a light valve 124, and a projection lens 126. The illumination unit 122 is capable of providing an illuminating beam L1. The light valve 124 is disposed on a transmission path of the illuminating beam L1. The light valve 124 is capable of transferring the illuminating beam L1 to the image beam L2. The image beam L2 refers to a beam carrying image information. The projection lens 126 is disposed on a transmission path of the image beam L2. The projection lens 126 is capable of transmitting the image beam L2 to the projection screen 110 to form an image (not shown).

It should be noted that, in the embodiment, the plurality of optical microstructures 112 are arranged along a first direction D1. When the projection apparatus 120 moves relative to the projection screen 110 along the first direction D1, the projection lens 126 moves relative to the light valve 124 along a second direction D2. The first direction D1 is opposite to the second direction D2. Specifically, the projection screen 110 has a first side 110a and a second side 110b opposite to each other. When a whole of the projection apparatus 120 (including the illumination unit 122, the light valve 124, and the projection lens 126) moves from a first position P1 corresponding to the first side 110a along the first direction D1 to a second position P2 corresponding to the second side 110b, the projection lens 126 moves relative to the light valve 124 along the second direction D2 opposite to the first direction D1. To be more specifically, the projection system 100 of the embodiment further includes a drive unit 130 connected to the projection apparatus 120. The drive unit 130 is capable of controlling a moving direction of the projection apparatus 120 relative to the projection screen 110 and controlling a moving direction of the projection lens 126 relative to the light valve 124.

In the embodiment, each of the optical microstructures 112 has a first side surface 112a, a second side surface 112b, and a bottom surface 112c connected to the first side surface 112a and the second side surface 112b. The first side surface 112a faces the first side 110a of the projection screen 110. The second side surface 112b faces the second side 110b of the projection screen 110. A normal vector of the bottom surface 112c is substantially perpendicular to the first direction D1. The first side surface 112a and the second side surface 112b are oblique relative to the bottom surface 112c, and an oblique direction of the first side surface 112a is opposite to an oblique direction of the second side surface 112b. For example, the optical microstructures 112 of the embodiment may be triangular prisms. An extension direction D3 of the optical microstructures 112 staggers with the first direction D1 and the second direction D2. In the embodiment, the extension direction D3 of the optical microstructures 112 is perpendicular to the first direction D1 and the second direction D2.

In the embodiment, an included angle θ1 between the first side surface 112a and the bottom surface 112c may be equal to an included angle θ2 between the second side surface 112b and the bottom surface 112c. In other words, the optical microstructures 112 of the embodiment may be isosceles triangular prisms. However, optical microstructures of the invention are not limited to the optical microstructures 112; in other embodiments, the included angle θ1 between the first side surface 112a and the bottom surface 112c and the included angle θ2 between the second side surface 112b and the bottom surface 112c may be adjusted appropriately according to actual needs. In addition, the optical microstructures of the invention are not limited to triangular prisms.

As shown in FIG. 1, when the projection apparatus 120 of the embodiment moves from the first position P1 to the second position P2, the image beam L2 emitted by the projection apparatus 120 may deflect towards the first side 110a of the projection screen 110 by a guidance of the optical microstructures 112. A mechanism is detailed below.

Still referring to FIG. 1, the projection lens 126 of the embodiment has an optical axis X1. The light valve 124 has a central axis X2 and an active surface 124a. The central axis X2 passes through a center of the active surface 124a and is perpendicular to the active surface 124a. When the projection apparatus 120 moves from the first position P1 to the second position P2, a shortest distance d1 between the optical axis X1 of the projection lens 126 and the first side 110a is shorter than a shortest distance d2 between the central axis X2 of the light valve 124 and the first side 110a. At this time, through image formation of the projection lens 126, the image beam L2 from the light valve 124 may be transmitted from a left side of the optical axis X1 to a right side of the optical axis X1 and forms a real image on the projection screen 110. In brief, with an actuation mode that a moving direction of the whole of the projection apparatus 120 is opposite to a moving direction of the projection lens 126 relative to the light valve 124, the projection direction of the projection apparatus 120 (i.e. a transmission direction of the image beam L2 after the image beam L2 leaving the projection apparatus 120) may be roughly towards a direction opposite to the moving direction of the whole of the projection apparatus 120.

Figure 2:
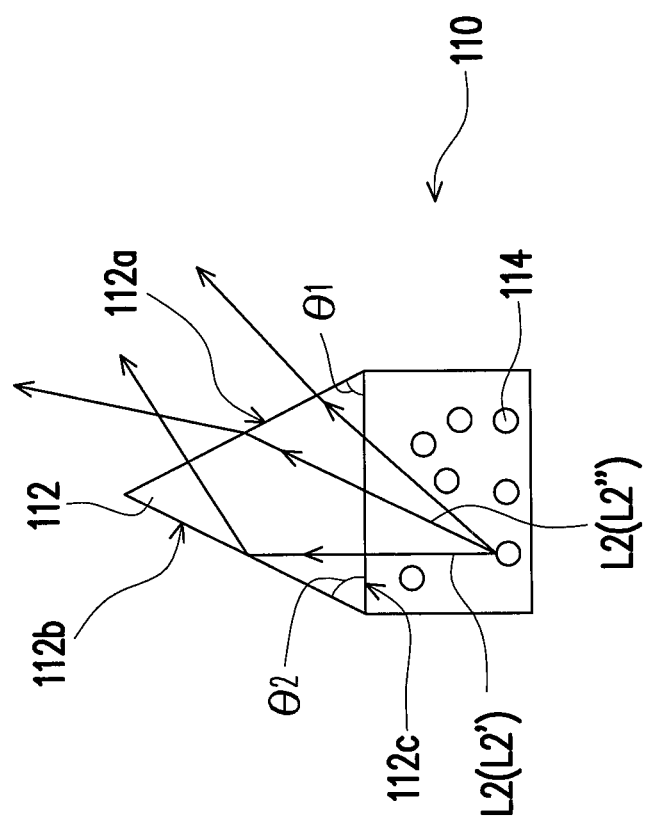
FIG. 2 illustrates a portion of a projection screen in FIG. 1 and illustrates an image beam transmitting in the portion of the projection screen.

Then, with a collocation of the projection direction of the projection apparatus 120 and the optical microstructures 112 of the projection screen 110, the image beam L2 may deflect towards a certain direction; therefore, the projection system 100 of the embodiment may restrict watching angles of the viewers. Referring to FIGS. 1 and 2, after the image beam L2 emitted by the projection apparatus 120 enters the projection screen 110, a portion of the image beam L2' (shown in FIG. 2) is totally reflected by the second side surface 112b and deflects towards the first side 110a of the projection screen 110. Another portion of the image beam L2" (shown in FIG. 2) is refracted by the first side surface 112a and deflects towards the first side 110a of the projection screen 110. At this time, as shown in FIG. 1, the image beam L2 is transmitted towards an upper right corner of FIG. 1, so that users at certain positions are able to watch an image carried by the image beam L2. In addition, according to different needs of the users, sizes of the included angle θ1 between the first side surface 112a and the bottom surface 112c of the optical microstructures 112 and the included angle θ2 between the second side surface 112b and the bottom surface 112c may be changed, a direction of the image beam L2 intending to deflect after passing through the projection screen 110 may be adjusted.

Figure 3:
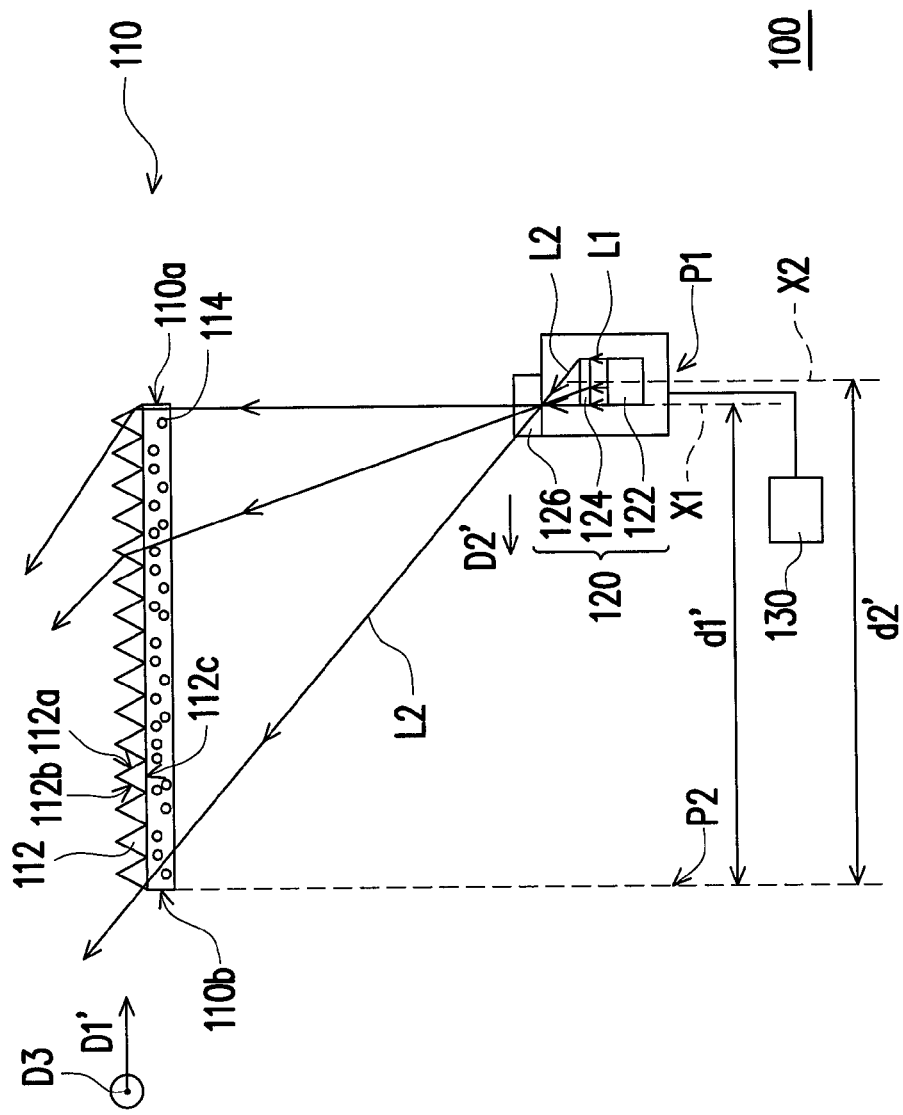
FIG. 3 illustrates a projection apparatus in FIG. 1 moving from a second position to a first position.

Referring to FIG. 3, as the projection apparatus 120 moves from the second position P2 to the first position P1 along a first direction D1', the projection lens 126 moves relative to the light valve 124 along a second direction D2' opposite to the first direction D1'. When the projection apparatus 120 moves from the second position P2 to the first position P1, a shortest distance d1' between the optical axis X1 of the projection lens 126 and the second side 110b is shorter than a shortest distance d2' between the central axis X2 of the light valve 124 and the second side 110b. At this time, through the image formation of the projection lens 126, the image beam L2 from the light valve 124 may be transmitted from the right side of the optical axis X1 to the left side of the optical axis X1 and forms a real image on the projection screen 110.

Figure 4:
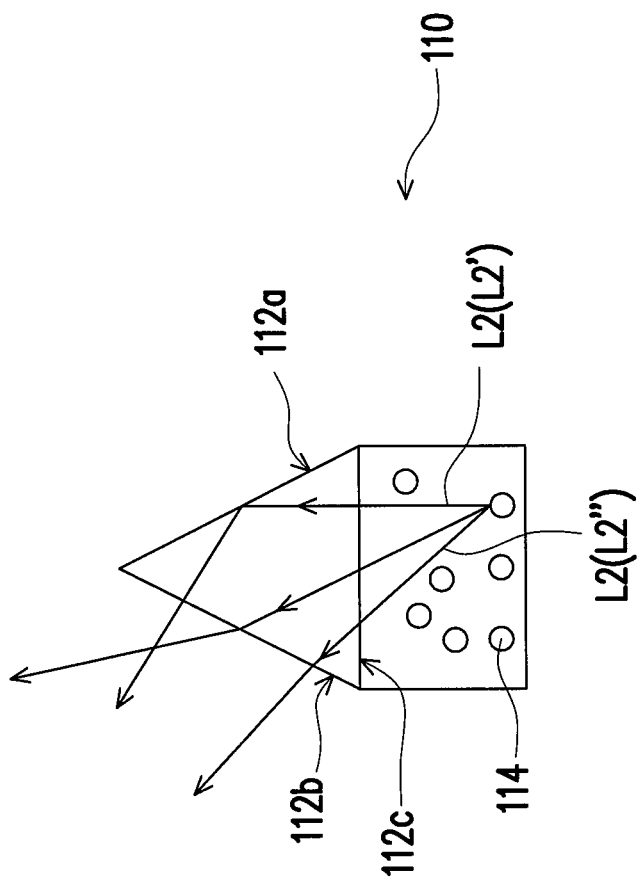
FIG. 4 illustrates a portion of a projection screen in FIG. 3 and illustrates an image beam transmitting in the portion of the projection screen.

Referring to FIGS. 3 and 4, when the projection apparatus 120 moves from the second position P2 to the first position P1 along the first direction D1', a portion of the image beam L2' (shown in FIG. 4) is totally reflected by the first side surface 112a and deflects towards the second side 110b of the projection screen 110, and another portion of the image beam L2" (shown in FIG. 4) is refracted by the second side surface 112b and deflects towards the second side 110b of the projection screen 110. At this time, as shown in FIG. 3, the image beam L2 is transmitted towards an upper left corner of FIG. 3, so that only users at certain positions are able to watch an image carried by the image beam L2.

Figure 5:
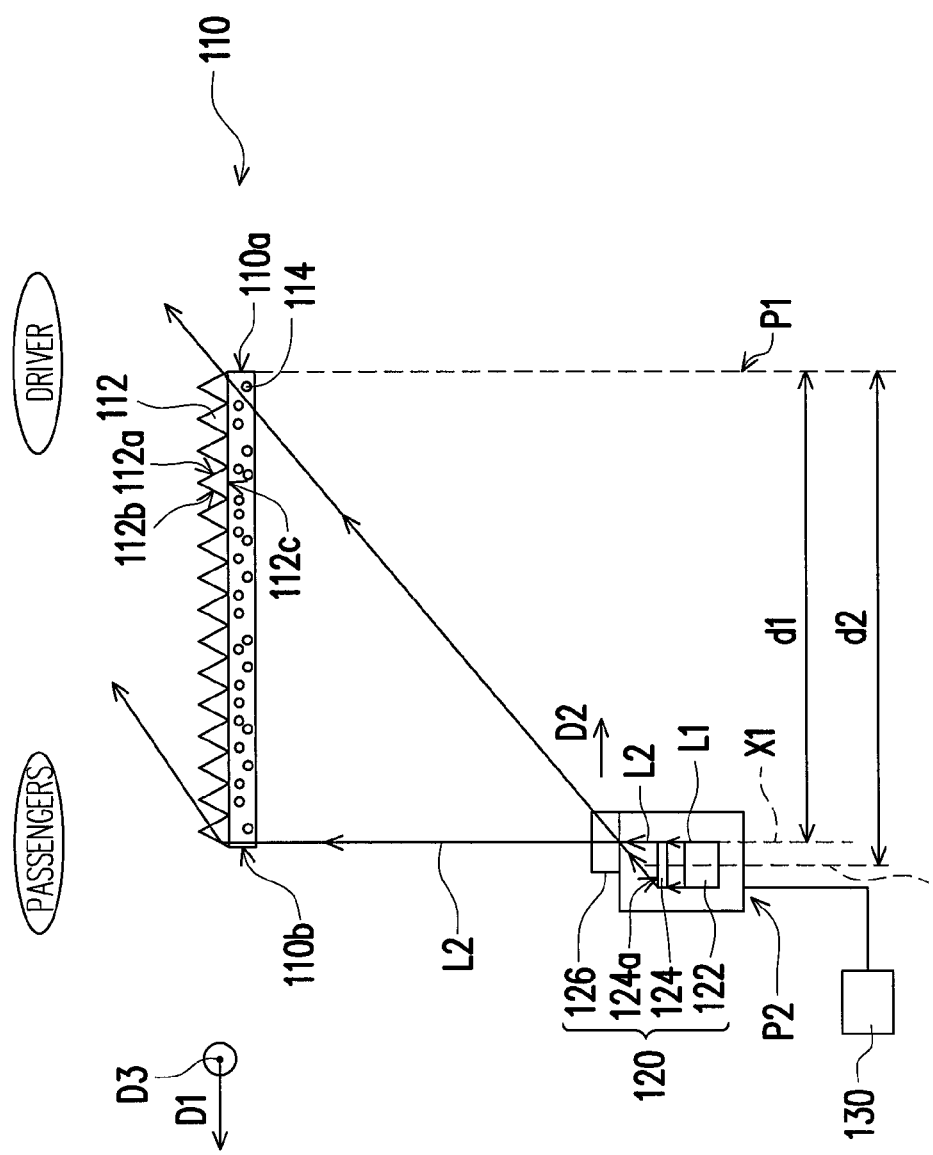
FIG. 5 illustrates a situation in which only a driver is able to watch an image projected by a projection system according to an embodiment of the invention.

In vehicle on-board applications, the projection system 100 of the embodiment may be disposed in vehicles and achieves various functions according to the users' needs. Examples are described below with reference to FIGS. 5-7. Referring to FIG. 5, when only a driver close to the first side 110a of the projection screen 110 intends to watch an image (such as a navigation image) on the projection screen 110 provided by the projection system 100, the projection apparatus 120 may move to the second position P2 through the drive unit 130. At this time, the image beam L2 is transmitted towards an upper right corner of FIG. 5 after leaving the projection screen 110, so that only the driver is able to watch the image. On the other hand, the image beam L2 projected by the projection apparatus 120, deflected or a totally reflected by the optical microstructures 112 on the projection screen 110, is transmitted towards the upper right corner of FIG. 5 after leaving the projection screen 110; therefore, passengers at an upper left corner of FIG. 5, i.e. passengers close to the second side 110b of the projection screen 110, are not able to watch the image and thus are unlikely to be disturbed by the image.

Figure 6:
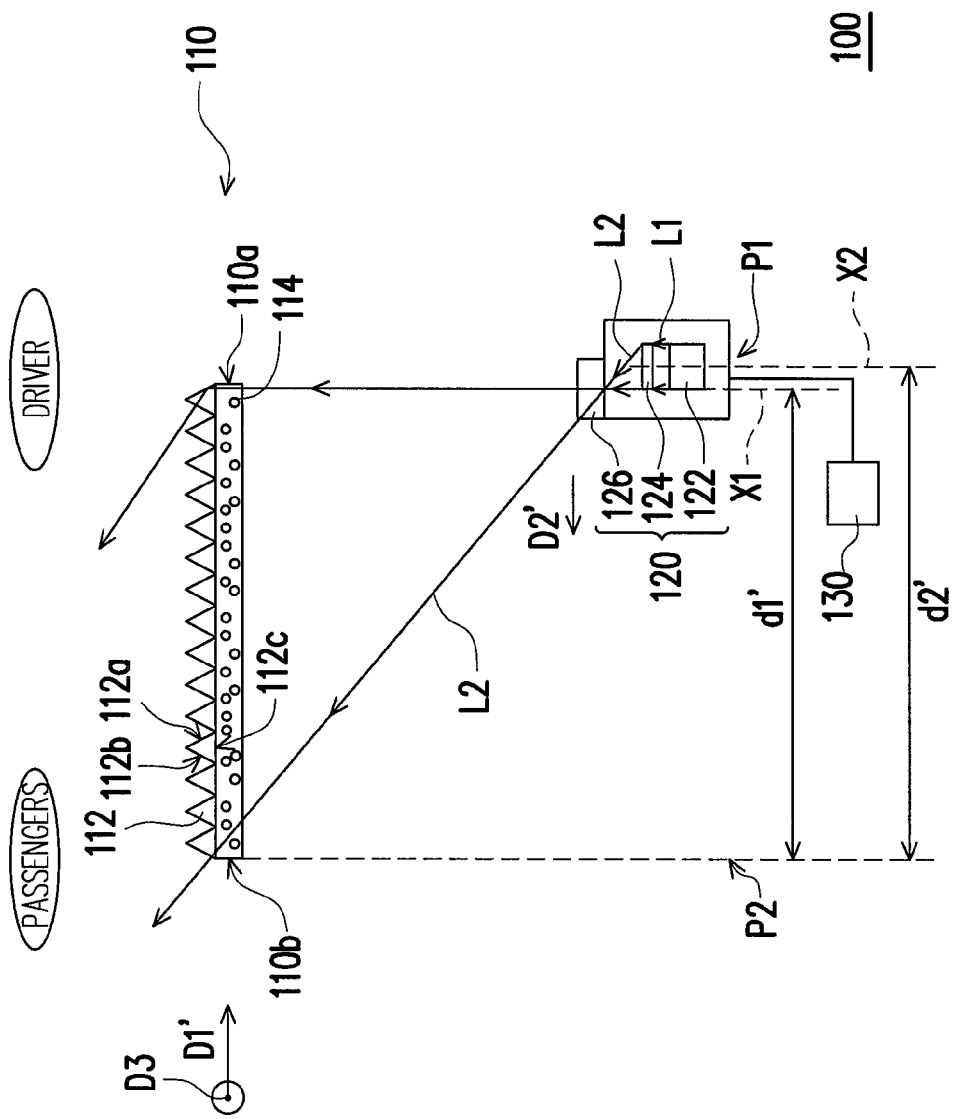
FIG. 6 illustrates a situation in which only passengers are able to watch an image projected by a projection system according to an embodiment of the invention.

Referring to FIG. 6, when only passengers close to the second side 110b of the projection screen 110 intends to watch an image (such as an entertainment image) on the projection screen 110 provided by the projection system 100, the projection apparatus 120 may move to the first position P1 through the drive unit 130. At this time, the image beam L2 is transmitted towards an upper left corner of FIG. 6 after leaving the projection screen 110, so that only the passengers are able to watch the image. On the other hand, the image beam L2 projected by the projection apparatus 120, deflected or totally reflected by the optical microstructures 112 on the projection screen 110, is transmitted towards the upper left corner of FIG. 6 after leaving the projection screen 110; therefore, a driver at an upper right corner of FIG. 6, i.e. a driver close to the first side 110a of the projection screen 110, is not able to watch the image (such as the entertainment image) and thus is unlikely to be disturbed by the image and violates traffic safety regulations.

Figure 7:
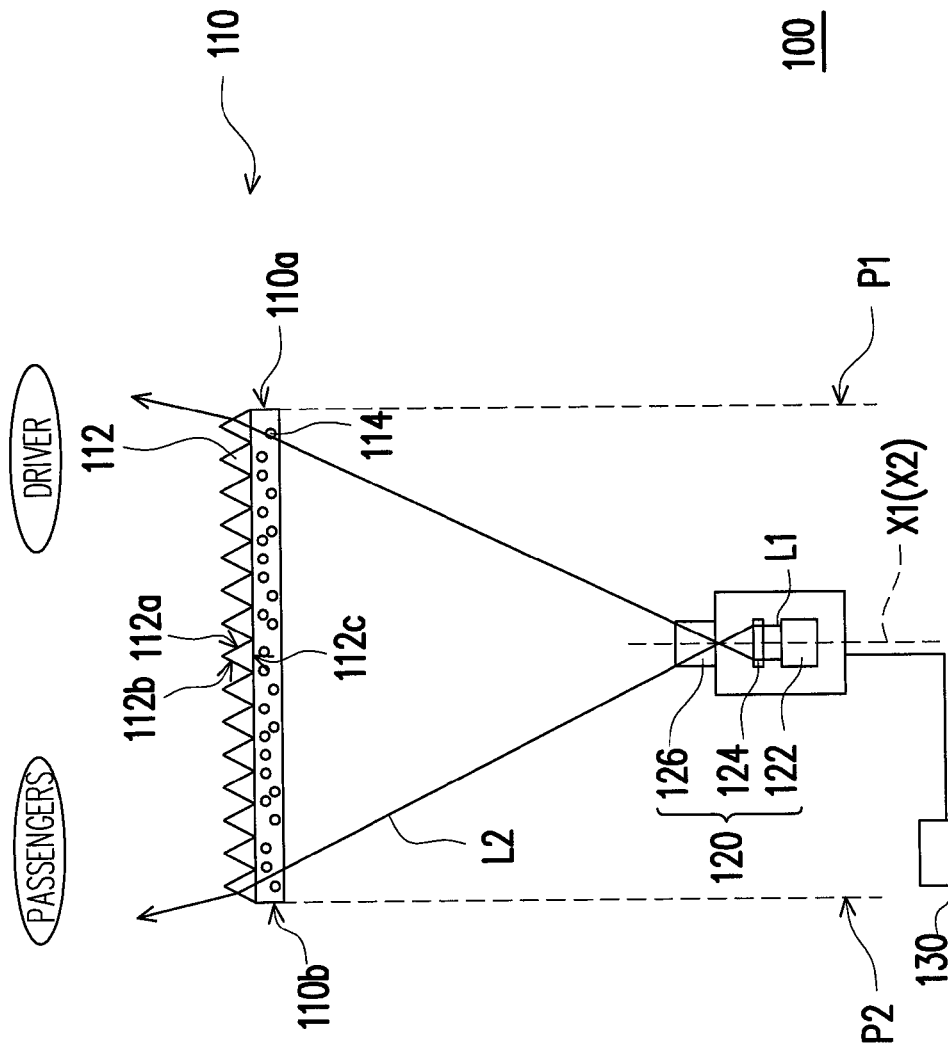
FIG. 7 illustrates a situation in which both a driver and passengers are able to watch an image projected by a projection system according to an embodiment of the invention.

Referring to FIG. 7, when both a driver and passengers intend to watch an image (such as an entertainment image) on the projection screen 110 provided by the projection system 100, the projection apparatus 120 may move to a position between the first position P1 and the second position P2 through the drive unit 130. At this time, a scope covered by the image beam L2 passing through the optical microstructures 112 of the projection screen 110 includes positions of the driver and the passengers, so that the driver and the passengers are able to watch the same image at the same time.

Figure 8:
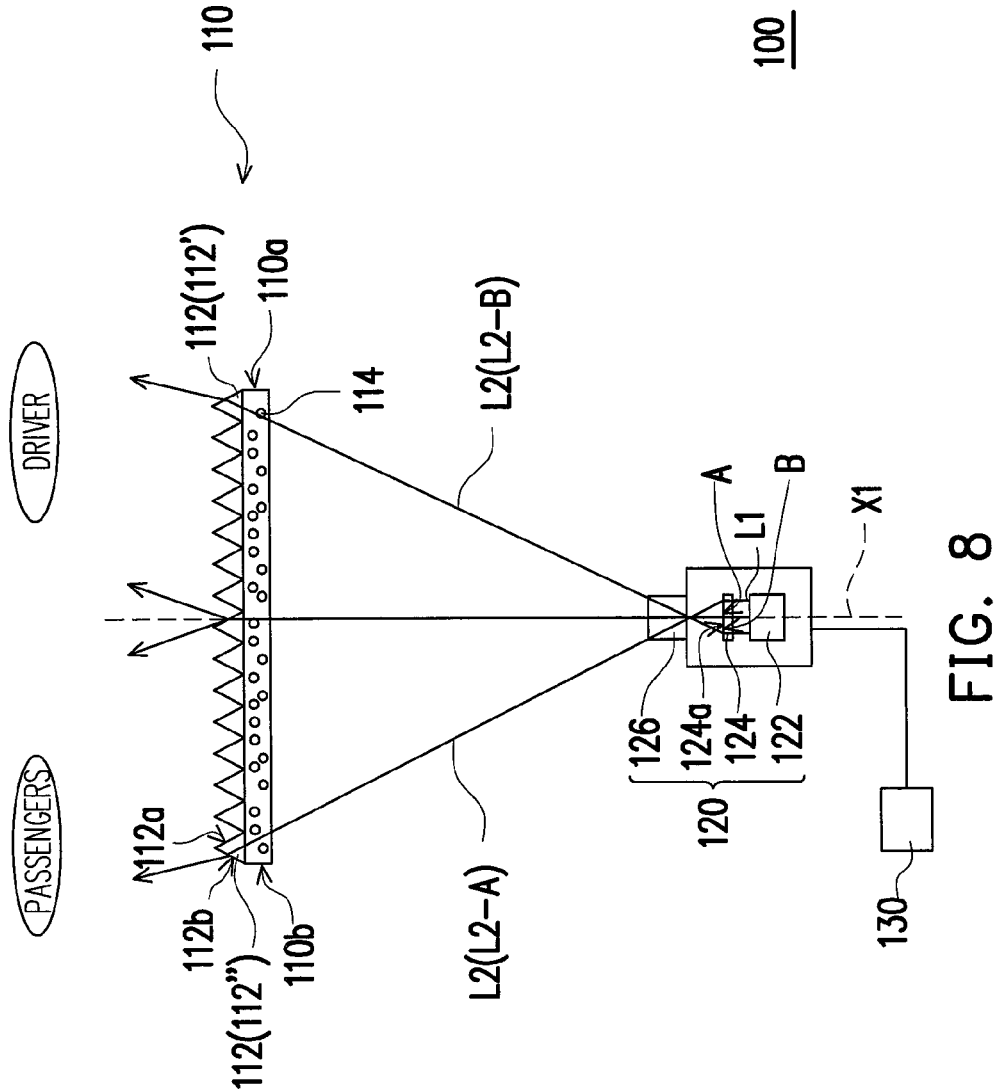
FIG. 8 illustrates a situation in which a driver and passengers watch different images at the same time through a projection system according to an embodiment of the invention.
Figure 9:
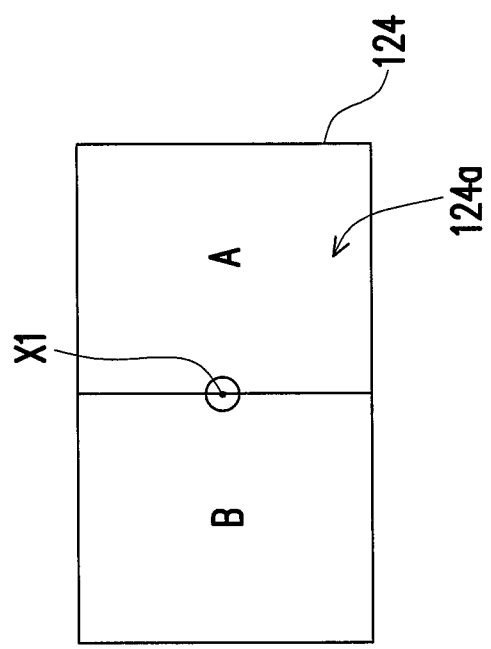
FIG. 9 illustrates an active surface of a light valve in FIG. 8.

In addition, it should be noted that the projection system 100 of the embodiment further allows the driver and the passengers to watch different images at the same time, which is described below with reference to FIGS. 8 and 9. Referring to FIG. 8, in the embodiment, the plurality of optical microstructures 112 includes a plurality of first optical sub-microstructures 112' located between the optical axis X1 and the first side 110a and a plurality of second optical sub-microstructures 112" located between the optical axis X1 and the second side 110b. Referring to FIGS. 8 and 9, an active surface 124a of the light valve 124 has a first image area A and a second image area B. A position of the first image area A corresponds to the projection screen 110 between the optical axis X1 and the first side 110a. A position of the second image area B corresponds to the projection screen 110 between the optical axis X1 and the second side 110b. An image presented by the first image area A may be different from an image presented by the second image area B. For example, the first image area A may present an entertainment image to be provided to the passengers, and the second image area B may present a navigation image to be provided to the driver.

In the embodiment, a portion of an image beam L2-A passing through the first image area A may deflect towards the second side 110b by a guidance of the second optical sub-microstructures 112" of the projection screen 110. At this time, passengers at an upper left corner of FIG. 8, i.e. passengers close to the second side 110b of the projection screen 110, are able to watch an image (such as an entertainment image) provided by the first image area A on the projection screen 110 between the optical axis X1 and the second side 110b. A portion of an image beam L2-B passing through the second image area B may deflect towards the first side 110a by a guidance of the first optical sub-microstructures 112' of the projection screen 110. At this time, a driver at an upper right corner of FIG. 8, i.e. a driver close to the first side 110a of the projection screen 110, is able to watch an image (such as a navigation image) provided by the second image area B on the projection screen 110 between the optical axis X1 and the first side 110a.

In addition, in the embodiment, since the first image area A is directly connected to the second image area B, there may be likely to be a problem of an unclear boundary between the image beam L2-A and the image beam L2-B close to the optical axis X1. To improve this problem, the active surface of the light valve may further have a compensation area between the first image area and the second image area. A method of how the compensation area improves the problem of the unclear boundary is described below with reference to FIGS. 10 and 11.

Figure 10:
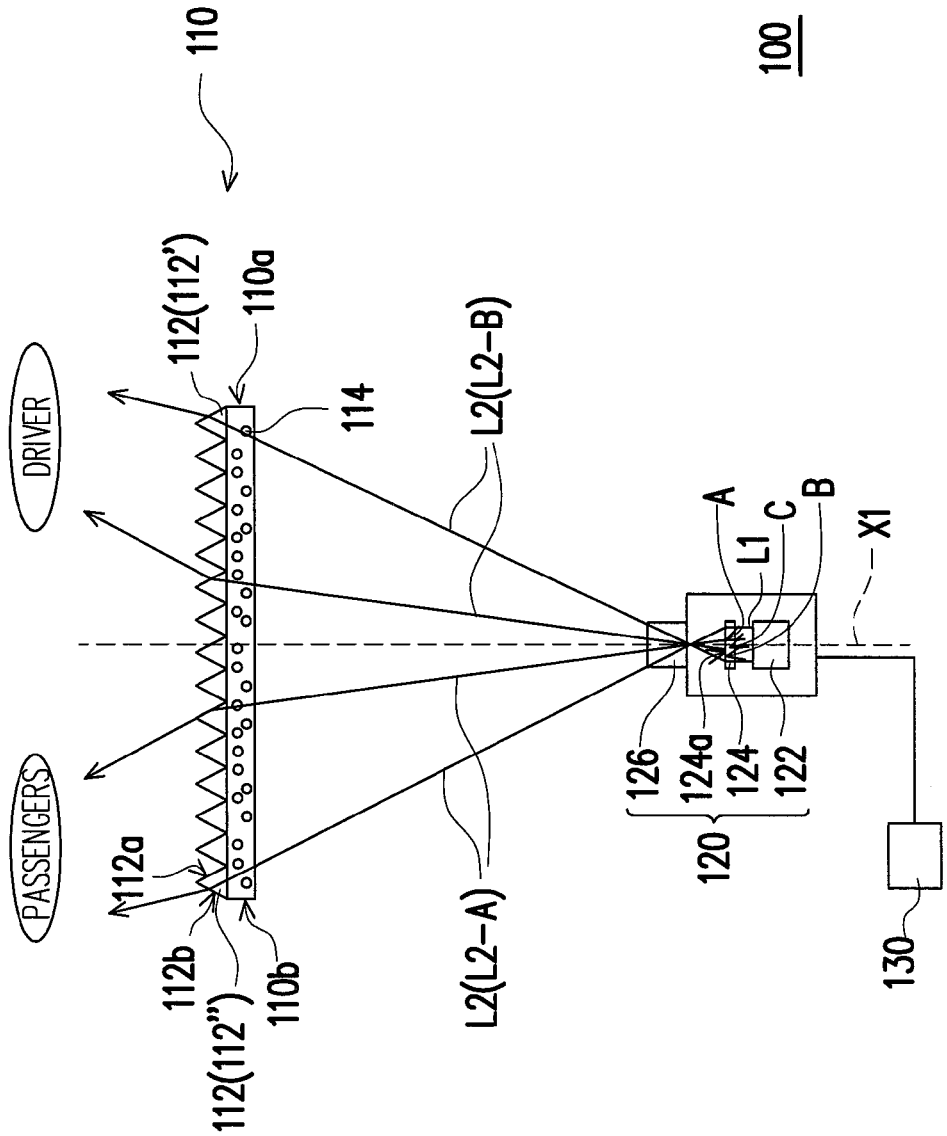
FIG. 10 illustrates a situation in which a driver and passengers watch different images at the same time through a projection system according to an embodiment of the invention.
Figure 11:
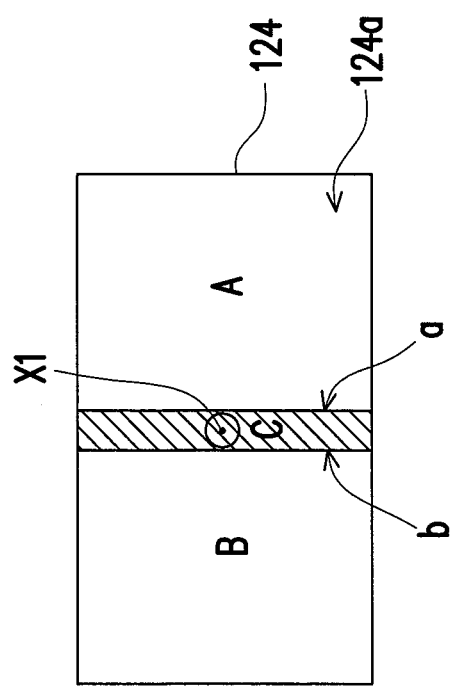
FIG. 11 illustrates an active surface of a light valve in FIG. 10.

Referring to FIGS. 10 and 11, to improve the problem of the unclear boundary, the active surface 124a of the light valve 124 may further have a compensation area C between the first image area A and the second image area B, wherein the optical axis X1 passes through the compensation area C. An illuminating beam L transmitted to the compensation area C is not transmitted to the projection screen 110. In other words, the compensation area C of the light valve 124 may prevent the illuminating beam L from passing through the compensation area C or directs the illuminating beam L transmitted to the compensation area C to other directions, so that the illuminating beam L is not transmitted to the projection screen 110. Through a partition of the compensation area C, the optical axis X1 may not pass through a boundary a (shown in FIG. 11) of the first image area A and a boundary b (shown in FIG. 11) of the second image area B. At this time, the first image area A and the second image area B may be separated clearly and located at two opposite sides of the optical axis X1. In this way, the image beam L2-A carrying the first image area A is completely located at a left side of the optical axis X1 after passing through the projection lens 126, and the image beam L2-B carrying the second image area B is completely located at a right side of the optical axis X1, thereby improving the problem of the unclear boundary.

Based on the above, the embodiments of the invention achieve at least one of the following advantages or effects. In embodiments of the invention, with a collocation of the optical microstructures of the projection screen and projection directions of the projection apparatus, the image beam emitted by the projection apparatus is watched by users at certain different areas after transmitted to the projection screen; therefore, a projection system of an embodiment of the invention satisfies various needs of the users.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims. In addition, any of the embodiments or any of the claims of the invention does not need to achieve all of the advantages or features disclosed by the invention. Moreover, the abstract and the headings are merely used to aid in searches of patent files and are not intended to limit the scope of the claims of the invention. In addition, terms such as "first" and "second" mentioned in the specification or the claims are only for naming the elements or distinguishing different embodiments or scopes and are not intended to limit the upper limit or the lower limit of the number of the elements.

What is claimed is:

1. A projection system, comprising:
   a projection screen comprising a plurality of optical microstructures, the optical microstructures being arranged along a first direction; and
   a projection apparatus capable of moving relative to the projection screen along the first direction, the projection apparatus comprising:
   an illumination unit for providing an illuminating beam;
   a light valve disposed on a transmission path of the illuminating beam provided by the illumination unit to convert the illuminating beam into an image beam; and
   a projection lens disposed on a transmission path of the image beam, the image beam being transmitted to the projection screen through the projection lens, wherein the projection lens is capable of moving relative to the light valve along a second direction, and the first direction and the second direction are opposite directions,
   wherein the projection screen comprises a first side and a second side opposite to each other, the projection lens comprises an optical axis, the plurality of optical microstructures includes a plurality of first optical sub-microstructures located between the optical axis and the first side and a plurality of second optical sub-microstructures located between the optical axis and the second side, an active surface of the light valve towards the projection lens comprises a first image area and a second image area, a position of the first image area corresponds to the projection screen between the optical axis and the first side, a position of the second image area corresponds to the projection screen between the optical axis and the second side, a portion of the image beam passing through the first image area deflects towards the second side of the projection screen by a guidance of the second optical sub-microstructures, and a portion of the image beam passing through the second image area deflects towards the first side of the projection screen by a guidance of the first optical sub-microstructures.

2. The projection system as recited in claim 1, wherein the active surface of the light valve further comprises a compensation area, the compensation area is located between the first image area and the second image area, and the optical axis passes through the compensation area.

3. The projection system as recited in claim 1, when the projection apparatus moves from a first position corresponding to the first side along the first direction to a second position corresponding to the second side, the image beam is transmitted to the projection screen and then deflects towards the first side of the projection screen by a guidance of the optical microstructures.

4. The projection system as recited in claim 3, wherein the projection lens comprises the optical axis, the light valve comprises a central axis and the active surface towards the projection lens, the central axis passes through a center of the active surface and is perpendicular to the active surface, and when the projection apparatus moves from the first position to the second position, a shortest distance between the optical axis and the first side is shorter than a shortest distance between the central axis and the first side.

5. The projection system as recited in claim 1, wherein each of the optical microstructures comprises a first side surface, a second side surface, and a bottom surface connected to the first side surface and the second side surface, the first side surface faces the first side, the second side surface faces the second side, a normal vector of the bottom surface is substantially perpendicular to the first direction, the first side surface and the second side surface are oblique relative to the bottom surface, and an oblique direction of the first side surface is opposite to an oblique direction of the second side surface.

6. A projection system, comprising:
a projection screen comprising a plurality of optical microstructures, the optical microstructures being arranged along a first direction;
a projection apparatus capable of moving relative to the projection screen along the first direction, the projection apparatus comprising:
an illumination unit for providing an illuminating beam;
a light valve disposed on a transmission path of the illuminating beam provided by the illumination unit to convert the illuminating beam into an image beam; and
a projection lens disposed on a transmission path of the image beam, the image beam being transmitted to the projection screen through the projection lens, wherein the projection lens is capable of moving relative to the light valve along a second direction, and the first direction and the second direction are opposite directions; and
a drive unit connected to the projection apparatus, the drive unit being used for making the projection apparatus move relative to the projection screen along the first direction and making the projection lens move relative to the light valve along the second direction.

7. The projection system as recited in claim 6, wherein the projection screen comprises a first side and a second side opposite to each other, and when the projection apparatus moves from a first position corresponding to the first side along the first direction to a second position corresponding to the second side, the image beam is transmitted to the projection screen and then deflects towards the first side of the projection screen by a guidance of the optical microstructures.

8. The projection system as recited in claim 7, wherein the projection lens comprises an optical axis, the light valve comprises a central axis and an active surface towards the projection lens, the central axis passes through a center of the active surface and is perpendicular to the active surface, and when the projection apparatus moves from the first position to the second position, a shortest distance between the optical axis and the first side is shorter than a shortest distance between the central axis and the first side.

9. The projection system as recited in claim 6, wherein the projection screen comprises a first side and a second side opposite to each other, each of the optical microstructures comprises a first side surface, a second side surface, and a bottom surface connected to the first side surface and the second side surface, the first side surface faces the first side, the second side surface faces the second side, a normal vector of the bottom surface is substantially perpendicular to the first direction, the first side surface and the second side surface are oblique relative to the bottom surface, and an oblique direction of the first side surface is opposite to an oblique direction of the second side surface.

10. The projection system as recited in claim 9, wherein when the projection apparatus moves from a first position corresponding to the first side along the first direction to a second position corresponding to the second side, a portion of the image beam is totally reflected by the second side surface and deflects towards the first side of the projection screen, and another portion of the image beam is refracted by the first side surface and deflects towards the first side of the projection screen.

11. A projection system, comprising:
a projection screen comprising a plurality of optical microstructures, the optical microstructures being arranged along a first direction; and
a projection apparatus capable of moving relative to the projection screen along the first direction, the projection apparatus comprising:
an illumination unit for providing an illuminating beam;
a light valve disposed on a transmission path of the illuminating beam provided by the illumination unit to convert the illuminating beam into an image beam; and
a projection lens disposed on a transmission path of the image beam, the image beam being transmitted to the projection screen through the projection lens, wherein the projection lens moves relative to the light valve along a second direction when the projection apparatus moves relative to the projection screen along the first direction, and the first direction and the second direction are opposite directions, wherein the projection screen comprises a first side and a second side opposite to each other, the projection lens comprises an optical axis, the plurality of optical microstructures includes a plurality of first optical sub-microstructures located between the optical axis and the first side and a plurality of second optical sub-microstructures located between the optical axis and the second side, an active surface of the light valve towards the projection lens comprises a first image area and a second image area, a position of the first image area corresponds to the projection screen between the optical axis and the first side, a position of the second image area corresponds to the projection screen between the optical axis and the second side, a portion of the image beam passing through the first image area deflects towards the second side of the projection screen by a guidance of the second optical sub-microstructures, and a portion of the image beam passing through the second image area deflects towards the first side of the projection screen by a guidance of the first optical sub-microstructures.

12. The projection system as recited in claim 11, wherein the active surface of the light valve further comprises a compensation area, the compensation area is located between the first image area and the second image area, and the optical axis passes through the compensation area.

* * * * *